(12) United States Patent
Nhu

(10) Patent No.: US 9,959,242 B2
(45) Date of Patent: May 1, 2018

(54) KEYS AND SENSORS FOR DAILY CONSUMER ACTIVITIES

(71) Applicant: Hoang Nhu, Irvine, CA (US)

(72) Inventor: Hoang Nhu, Irvine, CA (US)

(73) Assignee: Hoang Nhu, Irvine, CA (US)

( * ) Notice: Subject to any disclaimer, the term of this patent is extended or adjusted under 35 U.S.C. 154(b) by 1066 days.

(21) Appl. No.: 13/889,267

(22) Filed: May 7, 2013

(65) Prior Publication Data

US 2013/0297711 A1    Nov. 7, 2013

Related U.S. Application Data

(60) Provisional application No. 61/643,782, filed on May 7, 2012.

(51) Int. Cl.
*G06F 15/163* (2006.01)
*G06Q 50/00* (2012.01)

(52) U.S. Cl.
CPC .......... *G06F 15/163* (2013.01); *G06Q 50/01* (2013.01)

(58) Field of Classification Search
CPC .............................. G06F 15/163; G06Q 50/01
See application file for complete search history.

(56) References Cited

U.S. PATENT DOCUMENTS

| | | | | |
|---|---|---|---|---|
| 7,526,351 B2* | 4/2009 | He | ................... | G10L 21/04 700/94 |
| 8,675,063 B2* | 3/2014 | Bentkovski | ........ | H04N 5/23203 348/143 |
| 9,183,490 B2* | 11/2015 | Moreton | ............ | G06Q 20/3226 |
| 2008/0022089 A1* | 1/2008 | Leedom | ................ | H04L 63/068 713/156 |
| 2012/0239742 A1* | 9/2012 | Moradi | .................. | H04W 4/206 709/204 |
| 2013/0106603 A1* | 5/2013 | Weast | ..................... | G06F 1/163 340/539.11 |

* cited by examiner

*Primary Examiner* — Brian Zimmerman
*Assistant Examiner* — Sara Samson
(74) *Attorney, Agent, or Firm* — Klein, O'Neill & Singh, LLP

(57) ABSTRACT

Communication accessories, such as keyfobs (KFs) and/or transmitter/receiver dongles, which can transmit and receive signals to enable connectivity between owners of different portable devices even when the devices are off or when in a sleep mode, are described. In some examples, the keyfobs and/or the dongles are programmed with connectivity tokens, such as being programmed with Facebook (FB) information, FB accounts or FBIDs, LinkedIn ID, or generically social network user information, that can be used to authenticate different smart portable devices belonging to different users to facilitate networking. Once the keyfobs and/or dongles are authenticated, they will buzz, sound, or otherwise alert their respective owners that one or more social network users, such as a FB user or a LinkedIn user, are within the general vicinity and that further actions through smart portable devices may be needed to connect the users.

25 Claims, 8 Drawing Sheets

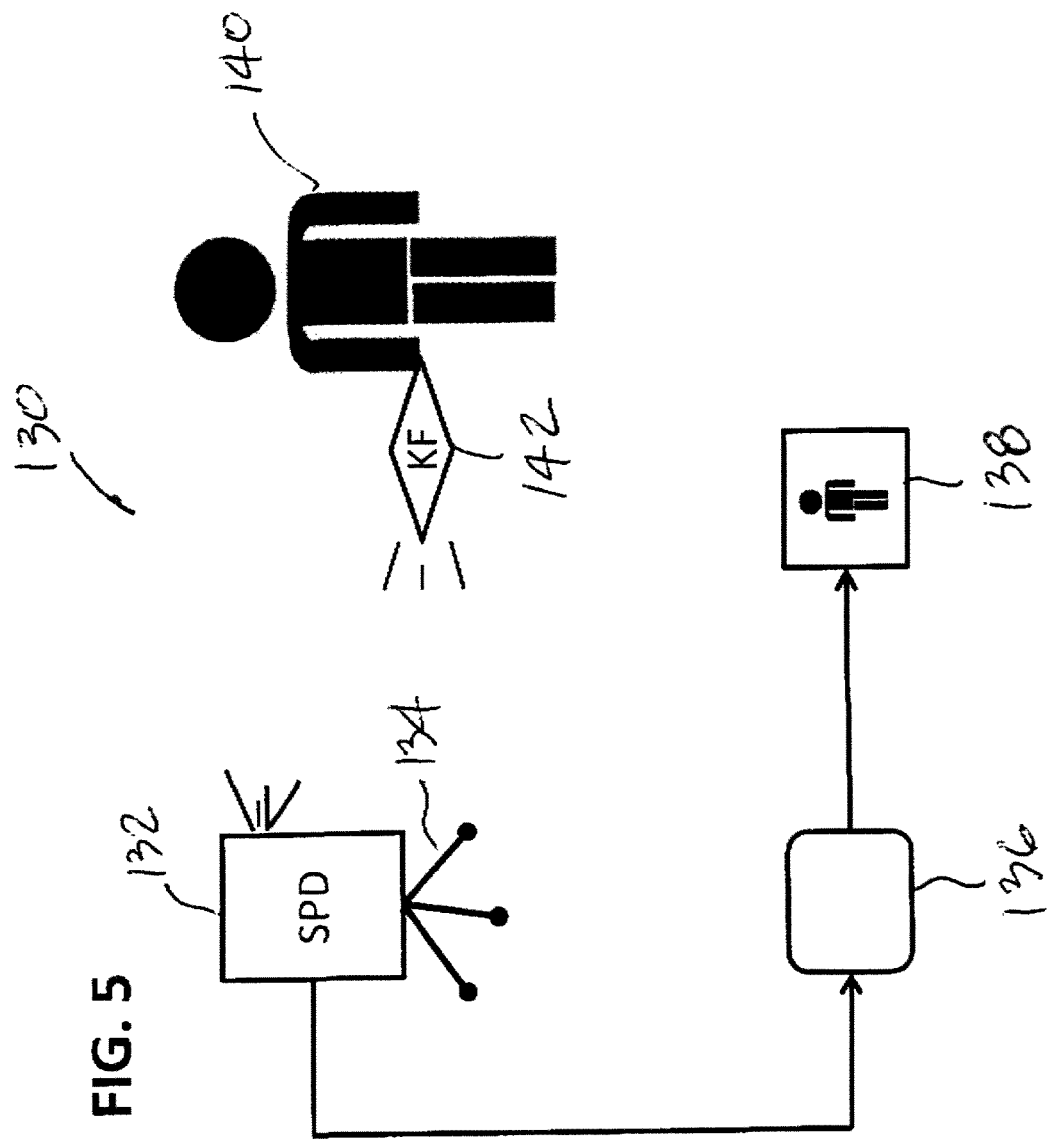

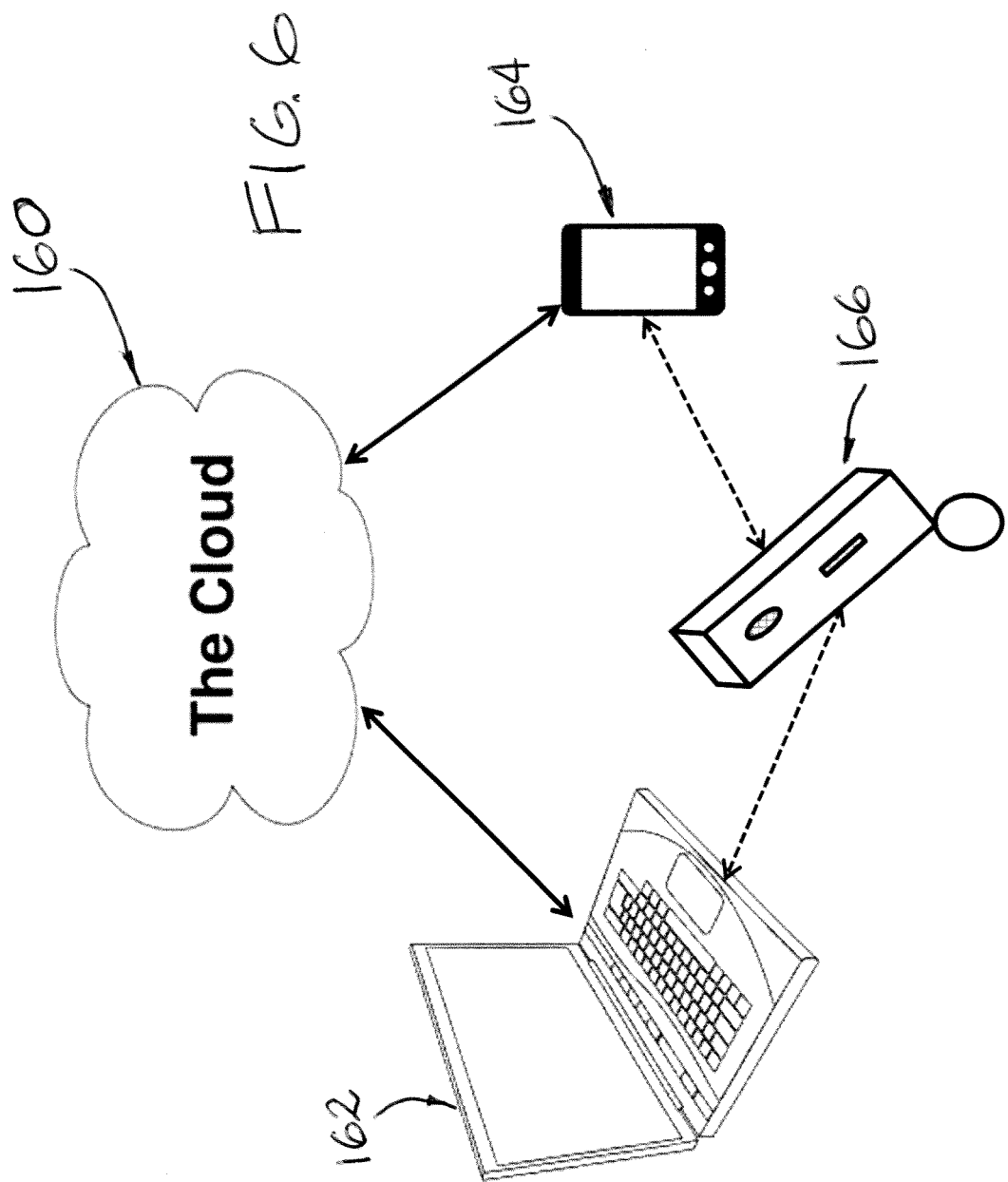

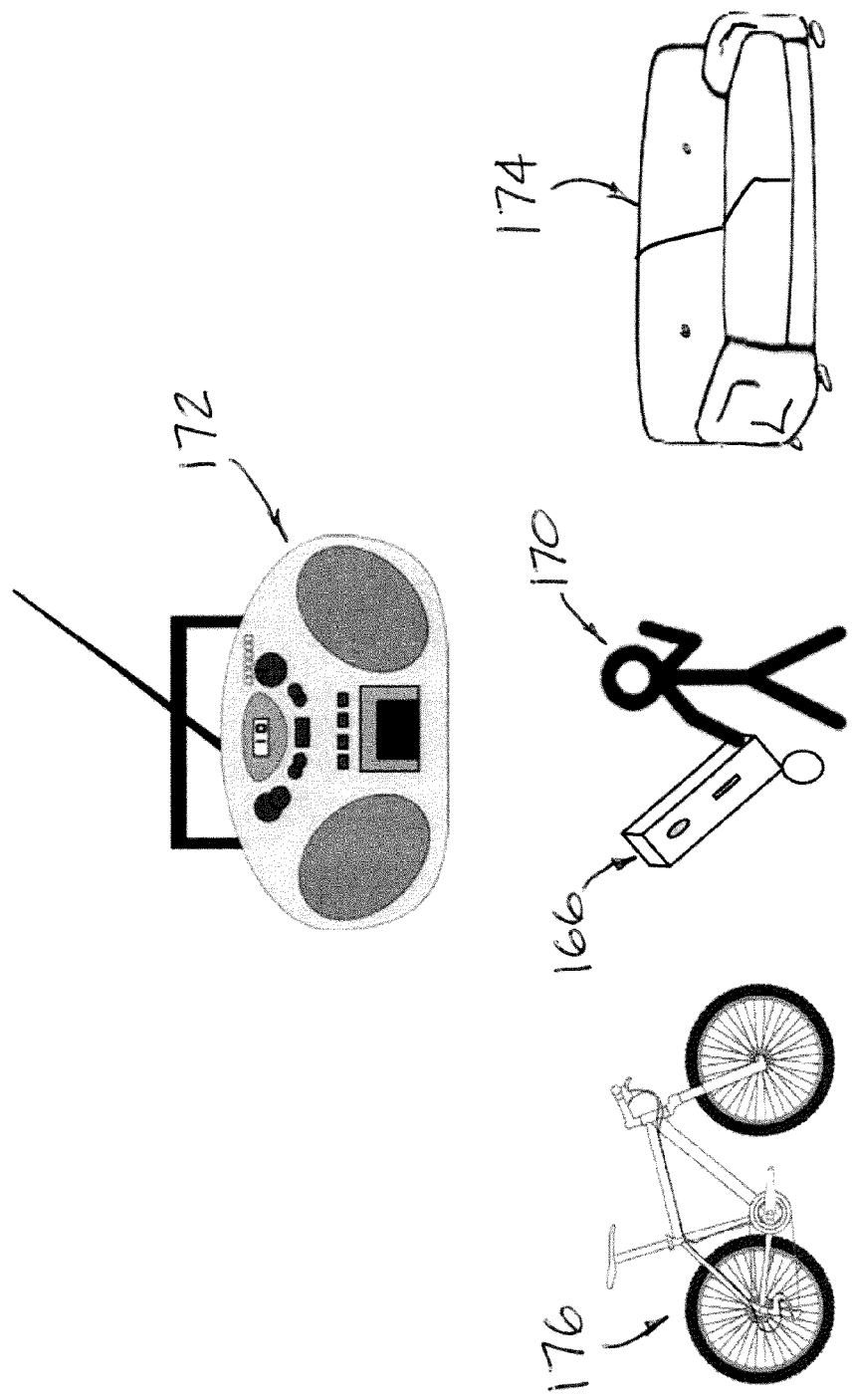

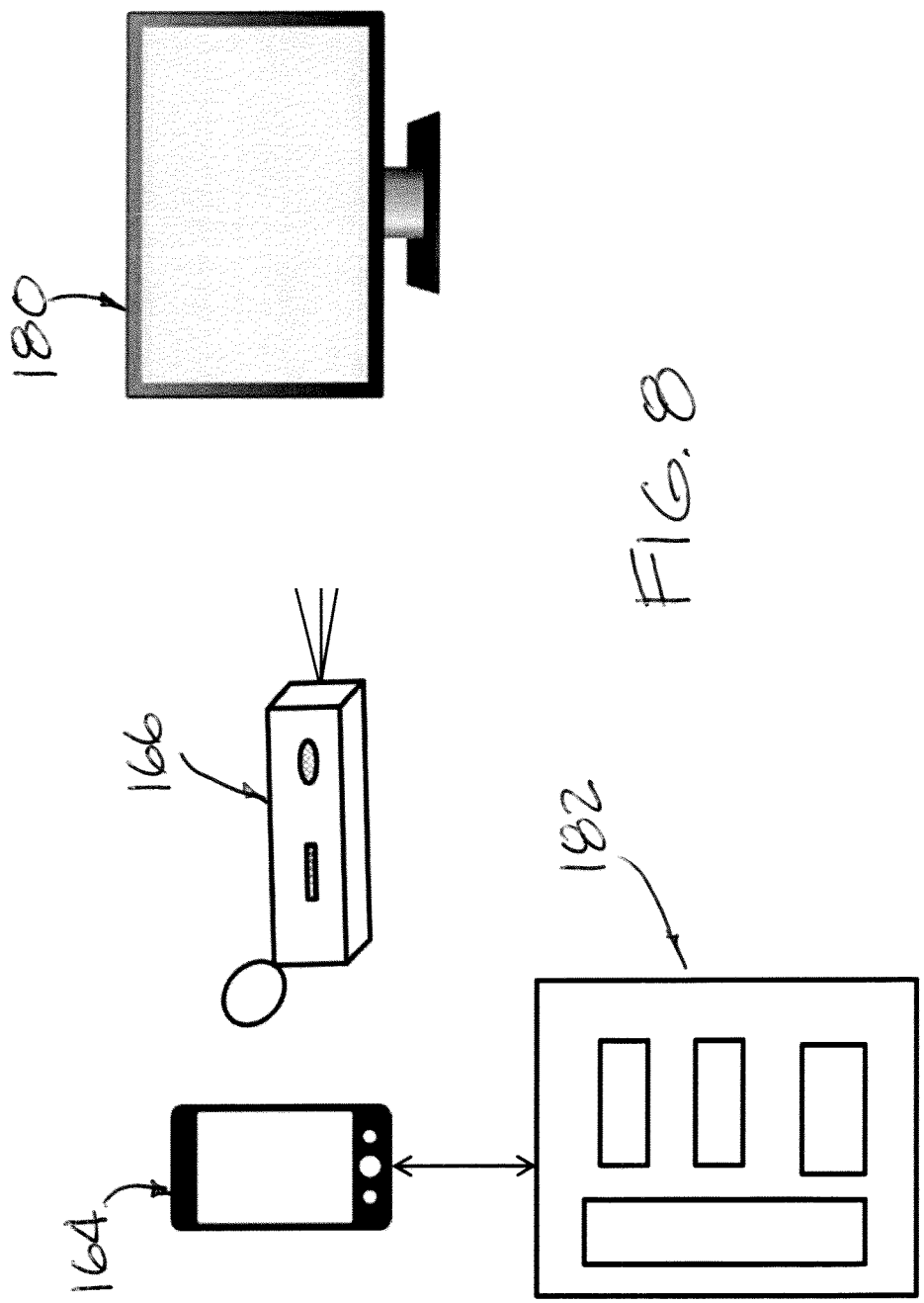

KEYS AND SENSORS FOR DAILY CONSUMER ACTIVITIES

CROSS-REFERENCE TO RELATED APPLICATION

This is a regular utility application of provisional application Ser. No. 61/643,782, filed May 7, 2012, the contents of which are expressly incorporated herein by reference.

BACKGROUND

Facebook is a social networking service and website launched in early 2004. As of early 2012. Facebook is believed to have more than 900 million users, some more active than others. Users must register before using the site after which they may create a personal profile, add other users as friends, and exchange messages, including automatic notifications when they update their profiles. Additionally, users may join common-interest user groups, organized by workplace, school or college, or other characteristics, and categorize their friends into lists, such as "High School Buddies" or "Poker Night Pigs."

A 2009 study ranked Facebook as the most used social networking service by worldwide monthly active users. It has been estimated that Facebook has 138.9 million monthly unique U.S. visitors in May 2011. According to another report, in April 2010 an estimated 41.6% of the U.S. population had a Facebook account.

Users can create profiles with photos, lists of personal interests, contact information, and other personal information. Users can communicate with friends and other users through private or public messages and a chat feature. Estimates have placed between 20-30% of Facebook users as "power users," which is understood to mean users who frequently link, poke, post, and tag themselves and others.

To allay concerns about privacy, Facebook enables users to choose their own privacy settings and choose who can see specific parts of their profiles. The Web site is free to users, and generates revenue from advertising, such as banner ads. Facebook requires a user's name and profile picture to be accessible by everyone. Users can control who sees other information they have shared, as well as who can find them in searches, through their privacy settings.

Many new smartphones offer access to Facebook services either through their web-browsers or applications. The Facebook iPhone-compatible web site was launched in mid-2007 and within months, over 1.5 million people used it on a regular basis. Among the many features offered by the applications, improved services that include being able to respond to friend requests and notifications are big hits among users. Version 3.0 was released in August 2009 and added features such as events, and uploading video with an iPhone 3GS. In the latest update for the Facebook for iPhone app. GPS use is also integrated in the app under the section "places" in which you can discover moments and experiences when you and your friends are at the same place at the same time. This app is compatible with iPhone 3G, 3Gs, 4, and 4S running iOS 3.0 or later.

Microsoft developed an application for Facebook on their Windows Phone 7 platform, available in the Windows Phone Marketplace, Messages, Events, News Feed, and Photos can be pinned directly onto the phone's home screen. It also includes tile notifications for events, friend requests, tags, and so on Google's Android 2.0 OS automatically includes an official Facebook app. Motorola Droid is believed to incorporate this feature. The app has options to sync Facebook friends with contacts, which adds profile pictures and status updates to the contacts list. Research In Motion also offers a Facebook application for the BlackBerry. It includes a range of functions, including an ability to integrate Facebook events into the BlackBerry calendar, and using Facebook profile pictures for Caller ID.

Instagram is a free photo sharing program launched in October 2010 that allows users to take a photo, apply a digital filter to it, and then share it on a variety of social networking services, including Instagram's own. A distinctive feature confines photos to a square shape, similar to Kodak Instamatic and Polaroid images, in contrast to the 4:3 aspect ratio typically used by mobile device cameras.

Instagram was initially supported on iPhone, iPad, and iPod Touch and in early 2012 added support for Android camera phones running 2.2 or higher. Applications for Microsoft-based systems and BlackBerry can be expected to follow. Instagram is distributed via the iTunes App Store and Google Play, among other sources.

Nevertheless, Facebook's market growth started to stall in some regions, with the site losing as much as 7 million active users in the United States and Canada in May 2011. Thus, there appears to be a constant stream for different, unique, and interesting functions or applications for maintaining and even growing Facebook's user-base.

Although Facebook is a popular and powerful social networking service, its use on a portable device, such as iPhone, iPad, BlackBerry, and Android-based phones can be limited by the device's capability, which is to only operate when an application is turned on and "talking."Thus, when the application is off, when the portable device is off, or when the portable device is in sleep mode, Facebook's powerful functions are rendered ineffective by the device. Smart portable devices are frequently turned off or placed in sleep mode as power can quickly drain when constantly in use or when the individual has to attend to other businesses, such as when working.

SUMMARY

Accordingly, aspects of the present systems, devices, and methods include accessories, such as keyfobs (KFs), which can transmit and receive signals to enable connectivity between owners of different portable devices even when the devices are off or when in a sleep mode. In some examples, the keyfobs are programmed with connectivity tokens, such as being programmed with Facebook (FB) information, FB accounts or FBIDs, LinkedIn ID, gender information, race information, age information, marital status, business related-information, work-related information, or residence city and state information, or combinations thereof, that can be used to authenticate different smart portable devices belonging to different users to facilitate networking. Generically, the programmed information may be referred to as social network user information or identification. Once the keyfobs are authenticated, they can be caused buzz, vibrate, sound, or otherwise alert their respective owners that one or more social network users, such as a FB user or a LinkedIn user, are within the general vicinity and that further actions through smart portable devices may be needed to connect users. In other examples, transmitter/receiver dongles may be used with a smart portable devices to talk and listen, i.e., scan (listen) and advertise (talk), with other smart portable devices. In certain embodiments, such as being at a venue, a smart device may be used instead of a smart portable device, which is understood to be portable or mobile, such as being battery operated.

In some embodiments, the keyfobs and/or the dongles are programmed to have different buzz, vibration, or sound with different frequency or intensity depending on the device and the class or type of user that is authenticating with the keyfobs and/or dongles, such as level of profile match.

Keyfobs and dongles usable with the present device, system, and assembly are those that have an integrated chip and are programmable to receive and transmit connectivity tokens, consume little energy so that they can stay on for much longer durations than smart portable devices, and can alert their owners of the presence of other social network users. For each keyfob, a switch or button, which can be a soft switch or a hard switch, is desired so that the keyfob can be activated to advertise or deactivated to no advertise, and potentially to respond in certain ways to an incoming request to connect, depending on the level of a profile match.

A further feature of the present disclosure is a keyfob comprising a housing, a button, and an integrated chip, said integrated chip is programmed to advertise social network user identification for detecting by a smart portable device. In some examples, the social network user identification is linked to Facebook. In still yet other embodiments, the signal is detected by a smart device that is not portable, such as a plugged in laptop or desktop computer.

The keyfob described herein can advertise using Bluetooth connectivity and can include an integrated chip that is programmed to activate a camera on a smart portable device. In a particular embodiment, the Bluetooth connectivity is Bluetooth low energy (BLE) connectivity.

A still further feature of the present device and system is dongle comprising a housing, an integrated chip, and an interface for connecting to an audio jack or a docking connector, said integrated chip is programmed to advertise social network user identification for detecting by a smart portable device or for scanning for social network user identification. In another embodiment, the signal from the dongle is detected by a smart device that is either portable or not portable.

A system for facilitating user connections is also disclosed. In some examples, the system comprises a keyfob or a dongle comprising a housing and an integrated chip, said integrated chip is programmed to advertise social network user identification. The system can further include a first smart portable device comprising an integrated chip having an App operated therein, said App having a protocol for detecting said social network user identification advertised by said keyfob. The system can further include a first signal for buzzing, vibrating, or otherwise alerting the keyfob and a second signal comprising data about the first smart portable device stored by the keyfob; and a second smart portable device activated to communicate with the first smart portable device after they keyfob has been buzzed, vibrated, or otherwise alerted. In some embodiments, the smart device can be portable or not portable, such as being plugged into a power source.

A yet further feature of the present disclosure is a method for facilitating F-commerce. In some examples, the method can comprise: scanning for information advertised by at least one keyfob or at least one dongle; sending a signal to the at least one keyfob or the at least one dongle; and wherein the information scanned is related to social network user identification; and wherein the signal sent to the at least one keyfob or the at least one dongle is related to pricing for a merchandise, a meal, a drink, or combinations thereof.

Aspects of the present method can further include the steps of programming a keyfob to emit a signal upon activating a button: and sending the signal from the keyfob to a smart portable device, said signal activating a camera on the smart portable device. The camera may be held by a tripod, a cradle, or by a user.

The method in accordance to some embodiments can include the steps of editing the digital picture using an application on the smart portable device and posting the picture taken by the step of pressing the button on the keyfob on a social network website. In other embodiments, the picture taken by pressing the button on the keyfob further includes geotagging, which can include GPS latitude metadata, GPS longitude metadata, GPS position metadata, or combinations thereof. In still yet other embodiments, the picture taken by pressing the button on the keyfob further includes geotagging and the keyfob App has a protocol for determining the location of the picture to facilitate in recalling where the picture using the key fob was taken. For example, the picture can be of a car at a parking lot and the keyfob App can assist in locating where the user had parked by analyzing the geotagging metadata.

Another feature of the present method is a method for facilitating user connections. In some methods, the steps can include programming a keyfob or a dongle to advertise a first social network user identification; programming the keyfob or the dongle to store a second social network user identification; programming the keyfob or the dongle to alert before or after storing the second social network user identification; and programming the keyfob or the dongle to interact with a smart portable device having social network connection capability.

The method, wherein the keyfob is programmed to advertise the first social network user identification and the dongle is programmed to advertise a third social network user identification.

The method, wherein the alert is a buzz, a vibration, an audible alarm, or combinations thereof on the keyfob.

In a still further application of the present disclosure, a keyfob App operating on a smart device is programmed with proximity sensing using signal strengths of the various keyfobs to determine the range, such as in feet or yard, of the various keyfobs to the smart device that is running the keyfob App.

SUMMARY OF THE DRAWINGS

FIG. 5 is a schematic diagram showing a process of taking a digital picture using a keyfob.

FIG. 6 is a schematic diagram showing use of a keyfob with cloud computing.

FIG. 7 is a schematic diagram showing use of a keyfob to facilitate exercising.

FIG. 8 is a schematic diagram showing use of a keyfob with a television and with networking.

DETAILED DESCRIPTION

The detailed description set forth below in connection with the appended drawings is intended as a description of the presently preferred embodiments of communication accessories and social network using the communication accessories provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
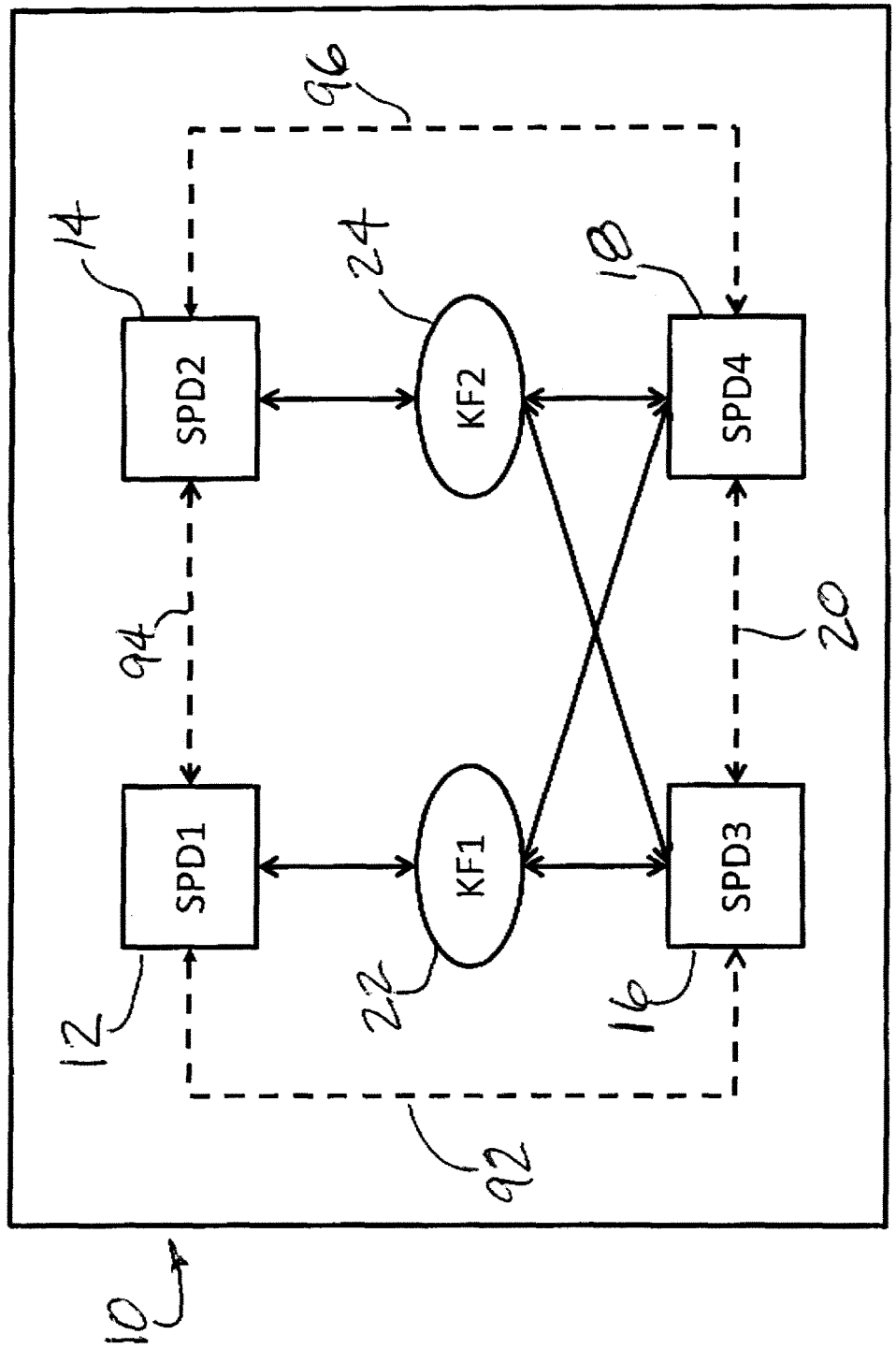
FIG. 1 is a schematic diagram of a venue having several smart portable devices and communication accessories located therein.

With reference now to FIG. 1, a venue 10 is shown housing, for example accommodating or holding, four different smart portable devices (SPD), which can be iPhones running on the iPhone Operating System (iOS), having element numbers 12, 14, 16, 18, respectively. The venue 10 may represent any number of locations or events, such as a theatre, a sports complex, a school, a work campus or building, a resort, an amusement park, or other locations or buildings having many social network users, i.e., users of the SPDs, present. The social networks users can be Facebook users or LinkedIn users, each with a unique social network user information, which can contain one or more of the following information: FB user information, FB user IDs, or FBIDs, LinkedIn ID, Instagram ID, gender information, race information, age information, marital status, business related-information, work-related information, residence city and state information, or combinations thereof, that can be used to authenticate different smart portable devices belonging to different users to facilitate networking. In some examples, the smart portable devices may be devices other than iPhones. For example, the other devices can be an iPad, a BlackBerry phone, a Droid phone, a Window Mobile Phone, an Android phone, etc. Like the iPhones, these other smart portable devices are capable of computing and running software, can send and receive information, can scan and detect signals, and can send and take pictures and/or videos. Preferably, the smart portable devices are equipped with Bluetooth connectivity, and more preferably with Bluetooth low energy (BLE) connectivity. For purposes of the present disclosure, the portable devices are understood to be iPhones but can embody other smart portable devices. Furthermore, unless the context indicates otherwise, communication accessories described herein may be a keyfob, a dongle, or both. Also, while certain embodiments are described with reference to smart portable devices, plugged in smart devices, such as laptops or desktops, may be used.

In the example shown in FIG. 1, device SPD1 12 and device SPD2 14 are either off or in sleep mode while device SPD3 and device SPD4 are on. Obviously, device SPD1 and SPD2 cannot communicate, such as send or receive signals, as they are either off or in sleep mode. Unless users of SPD3 16 and SPD4 18 are actively talking with one another or searching for one another through their FB accounts, such as posting messages about their activities, the two may not know about the other's presence within the venue 10 even though SPD3 and SPD4 may both be on. Thus, there may not be a connection 20 between SPD3 16 and SPD4 18 even though the two may be friends and their devices 16, 18 are on. However, in accordance with aspects of the present systems, devices, and methods, users of the other two portable devices SPD1 12 and SPD2 14 may access their social network accounts through their accessory devices, which can be keyfobs KF1 22, KF2 24, despite their SPDs being off or in sleep mode. For example, the keyfobs KF1 22 and KF2 24 may receive signals to alert their owners to turn on SPD1 12 and SPD2 14, respectively, to then communicate with other SPDs even though the two smart portable devices 12, 14 were previously off or in sleep mode.

In one embodiment, programmable keyfobs 22, 24 are provided each with a switch, such as a mechanical, toggle, or electrical switch, for example a soft key or a switch embodying biometric recognition, that can perform a number of functions, such as advertise a signal or message or activate a phone App using BLE connectivity. In one example, the keyfobs 22, 24 are programmed with tokens that broadcast or advertise, such as to transmit, the keyfob owners' social network user information when their respective switch is activated. Thus, when the keyfobs KF1 22 and KF2 24 are turned on by their respective owners at the venue 10, their social network user information, such as FBID, LinkedIn ID, or other information or combination of information discussed elsewhere herein, can be advertised and received by device users SPD3 16 and SPD4 18 even though devices SPD1 12, SPD2 14 are off or in sleep mode.

Smart portable devices SPD3 16 and SPD4 18 can each run an App that is specifically programmed to scan and detect advertised messages emitted from the keyfobs 22, 24, which is further discussed below with reference to FIGS. 2 and 3. For purposes of the present disclosure, the App that is specifically programmed to detect advertised messages and send data to authenticate the keyfobs is referred to as a keyfob App, or KFA. Once the keyfobs' signals have been detected by the devices 16, 18, which are on and each running the KFA, and the owners of the devices 16, 18 request authentication with the keyfobs, the keyfobs can be caused to buzz, vibrate, or alarm so that their respective owners can be alerted to turn on their respective smart portable devices SPD1 12 and SPD2 14 to further connect and socialize with the owners of the other devices 16, 18. For example, the two "on" devices 16, 18, when running the KFA, can see and detect advertised messages from nearby keyfobs and can reach out to those advertised keyfobs. In one example, the keyfobs can transmit Bluetooth low energy (BLE) signals to about a 30 yards radius or greater. However, the present disclosure is not limited to this range for when technology advances, this range can be expected to increase.

Although the example described in FIG. 1 is limited to four SPDs and two KFs, in other examples, there may be more than or fewer than four SPDs and more than two communication accessories, such more than two KFs and more than one dongle. For example, a theatre may have fifty keyfobs and ten dongles simultaneously advertising their respective signals and twenty smart portable devices that are on and actively running the keyfob App (KFA) to scan advertised signals. In other venues, there may be 75 keyfobs that are advertising, 20 dongles that are advertising, and 15 smart portable devices that are scanning and detecting. Thus, these numbers are exemplary only and not to be viewed as limiting. For discussion purposes, they may be referred to as a plurality of SPDs, KFs and communication accessories. Thus, when a smart portable device (SPD) running a KFA scans and detects, for example, sixty different social network information advertised by fifty different keyfobs and ten different dongles, the SPD owner can check the sixty different social network information for one or more users to view and connect, such as by scrolling through the list of advertised IDs and selecting certain FBIDs to connect. After a particular advertised signal is selected and the broadcasting KF and scanning/detecting SPD authenticate, the scanning/detecting SPD and the other SPD that is linked to the advertised KF can communicate and network, such as by launching the FB Apps or the web browser on the two SPDs to enable social networking.

Figure 2:
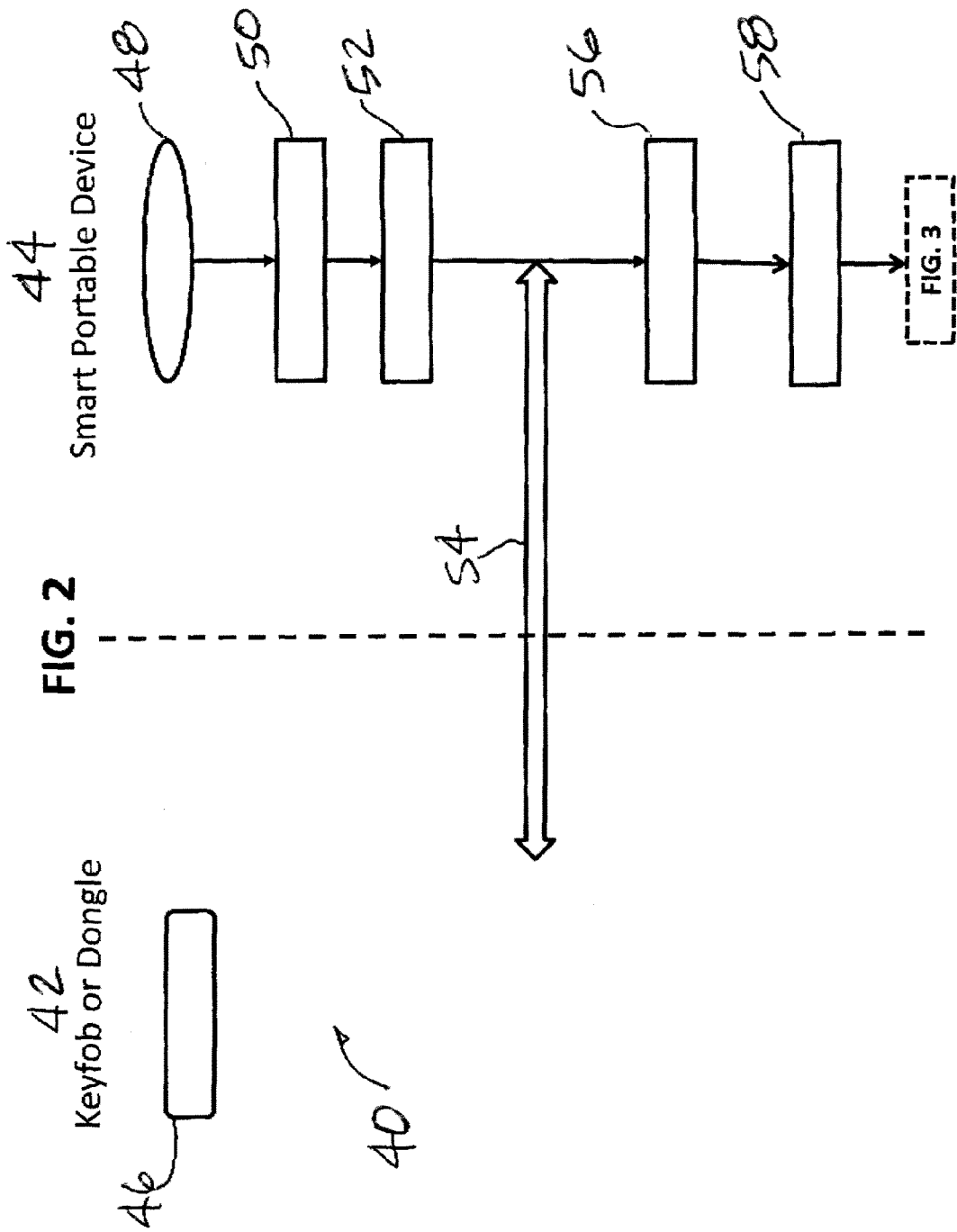
FIGS. 2 and 3 is a flow diagram depicting a method of communicating between a smart portable device and an communication accessory.
Figure 3:
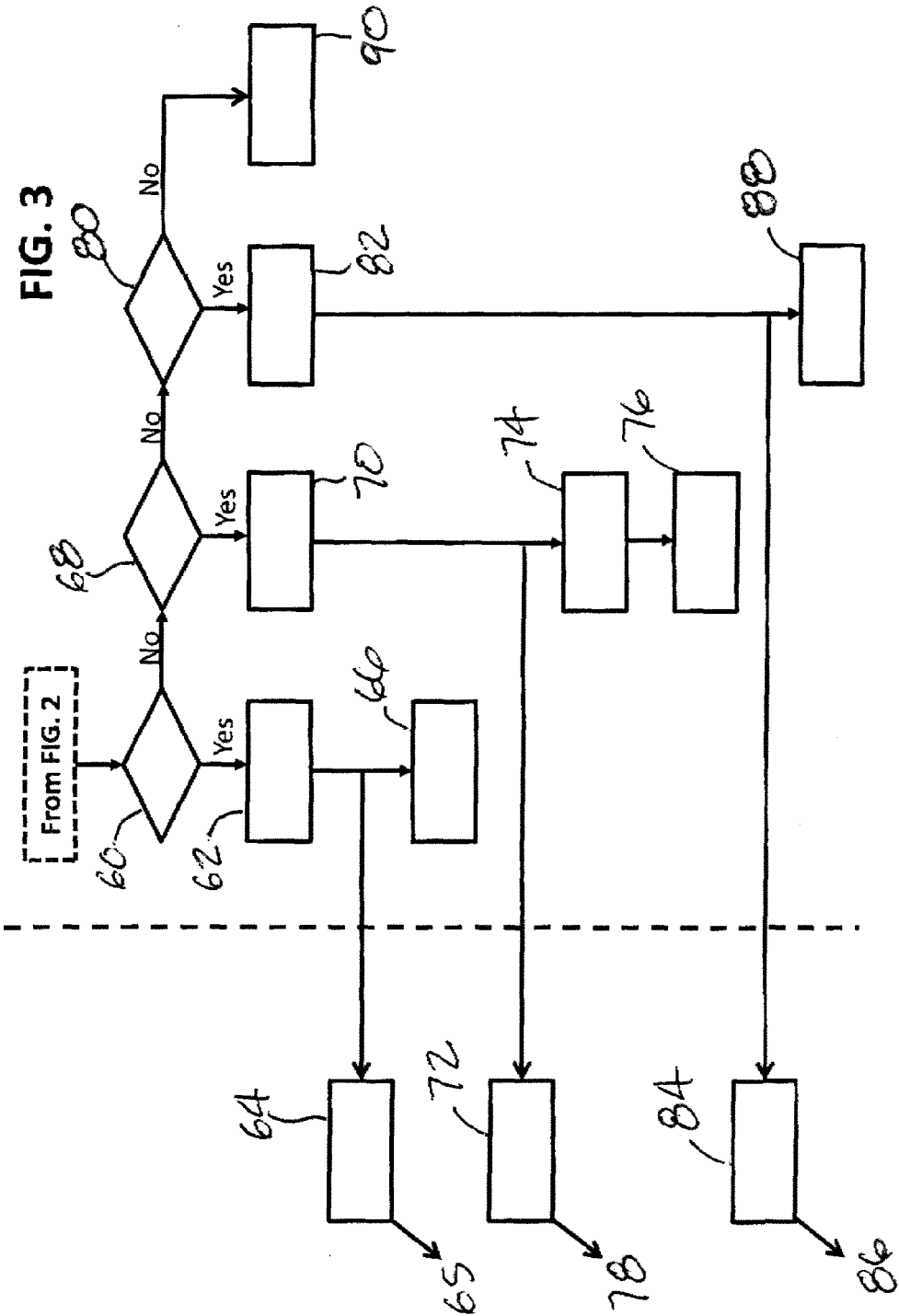

With reference now to FIGS. 2 and 3 in addition to FIG. 1, a flowchart 40 showing connectivity between a keyfob 42 and a smart portable device 44 is shown, which can represent a keyfob and a smart portable device shown in FIG. 1. In another example, instead of a keyfob, a dongle advertises the social network user information or identification and performs the steps described herein. In one example, the keyfob 42 is activated at 46, which may be done by pressing a button or pushing a switch on the keyfob to advertise. Using Bluetooth connectivity, such as BLE technology, the keyfob 42 advertises its social network user information, such as its FBID, for other social network users running the keyfob App to detect. For purposes of the following discussion, keyfob 42 is referred to as an advertising keyfob 42. In other embodiments, the keyfob advertises usernames, pseudo names, an email address, names from other social networks, such as LinkedIn, age, marital status, work-related information, business-related information, or other identifications for the SPD to detect. Smart phones are typically equipped with location services that can also be advertised or broadcasted by the keyfob 42. Thus, the keyfob 42 described herein is understood to include a user programmable instrument that can broadcast social network user information belonging to the keyfob owner for a smart device running the keyfob App (KFA) to detect to then initiate social networking, as further discussed below.

Nearby, such as within about a 40 yard radius, the user of the smart portable device 44 is running a keyfob App (KFA) that scans at step 48 for a list 50 of nearby advertised keyfobs. The list 50 is displayed on the SPD at 48. The user of the SPD 44 then scrolls down the list of social network user information advertised by nearby communication accessories, such as keyfobs and/or dongles, and selects the social network user information from the advertising keyfob 42 at step 52 to network or socialize. In practice, the advertised information can indicate a name or a feature that the SPD owner recognizes or compels the SPD to want to network and socialize.

At step 54, the keyfob 42 and the SPD device 44 connect, which is understood to mean authentication between the keyfob 42 and the device 44. In one example, authentication involves routine handshaking protocol between the keyfob 42 and the SPD 44 using Bluetooth connectivity, such as Bluetooth low energy (BLE) connectivity. In other examples, the handshaking protocol involves encryption or identifying unique ID address. In one particular example, a social network user information is stored, such as programmed, in the keyfob at a specified or unique address. When the SPD 44 runs the keyfob App (KFA), the SPD, by running the KFA, can detect and authenticate the unique address. In another example, the social network user information, such as Facebook ID or LinkedIn ID, is encrypted and stored onto the keyfob flash. A SPD running the keyfob App can then decrypt the information advertised by the keyfob and authenticate. In another embodiment, a user can log onto his or her keyfob App running on his or her SPD, encrypts his or her social network user information and then, through BLE connectivity, throws the encrypted ID onto the keyfob flash. In yet another embodiment, the user can log onto a PC or a laptop, encrypts his or her social network user information and then, through a cable or wireless connectivity, such as through a USB cable, transfers the encrypted ID onto the keyfob flash.

After authentication, the SPD 44 reads the social network user information, such as FBID and/or other FB related information, stored in the keyfob flash at step 56, which allows the SPD 44 to check with the social network website for the user's public social network information at step 58. For example, the SPD 44 can check the keyfob owner's public FB information or public LinkedIn information. Also, as the keyfob flash has storage memory that can store lots of information, the owner can choose to store an almost unlimited number of data or user information on the keyfob that he wishes to share. After the public information is displayed on the device 44, a number of different events or situations can transpire depending on the status or relationship of the social network users. If the displayed information on the SPD reveals that the keyfob owner is a friend 60, then a signal can be sent to the keyfob 42 at step 62. The signal 62 can be in the form of a buzz, a vibration, and/or an audible alarm at 64 to notify the keyfob owner of a potential contact and an alert, buzz, vibrating screen, and/or visual feedback on the SPD 44 at 66 to confirm that a request has been sent to the keyfob 42. Alternatively, the SPD 44 is not notified of the sent message to the keyfob. In some embodiment, the social network user information of the owner of SPD 44 is written into the flash of the keyfob 42 at step 64 so that the keyfob owner can determine who is buzzing him or her. The keyfob owner can then optionally activate his or her smart portable device to read the social network user information of the owner of SPD 44 stored in the keyfob 42 and communicate with the SPD 44 after verifying the identity of the SPD's owner. In one embodiment, communication between the two users after authentication, i.e., between the SPD of the keyfob owner and the scanning SPD 44, may be through the social network Apps running on the SPD linked to the keyfob and on SPD 44, which is shown at 65. In alternative embodiments, the SPDs can connect through web-browsers running on the SPDs. In a particular example, the social network App is a Facebook App running on the SPD 44 and running on the keyfob owner's SPD.

If the displayed information reveals that the owner of the keyfob 42 is not a friend but that the owner is a friend of a friend, i.e., a mutual friend, then a signal can be sent at 70 to buzz the keyfob at 72 that a person is interested in networking or socializing with the user. A friendship determination can be evaluated by exploring the network user's accounts for circles of friends and making a determination at 68. In one embodiment, a buzz or otherwise an alert is sent to the SPD 44 at 74 to indicate that a signal has been sent to the keyfob. On the SPD 44, a list of common or mutual friends 76 is displayed by combing through the keyfob user's social network account(s) for his or her circle of friends. In one example, the SPD 44 also send social network user information of the SPD-owner and other information to the keyfob 42, such as a list of mutual friends, so that when the keyfob owner turns on his or her SPD, he or she can recognize the friend-of-a-friend relationship or other information to show some commonality. The keyfob owner can then activate his or her smart portable device to communicate with the SPD 44 at 78.

If the displayed information 80 reveals that the keyfob owner is not a friend and does not have a mutual friend, then the keyfob APP can ask whether the SPD user would like to make friend with the keyfob owner. It is believed that by activating the keyfob 42 and advertising the owner's social network user information, such as the owner's FBID, the keyfob owner is likely to be open to networking with other social network users and therefore will likely be open to the invitation from the SPD 44. If the owner of the SPD 44 decides to make friend with the keyfob owner, he or she can send a signal at 82 to initiate the process. In one example, this can be implemented by sending a signal to the keyfob at 84 to buzz or otherwise notify the owner of the keyfob that someone would like to make friend. In an example, the information sent at 84 includes public social network user information of the SPD owner, such as FBID of the SPD owner. Concurrently, a buzz or otherwise an alert can be sent to the SPD device at 88 that a signal has been sent to the keyfob. The keyfob owner can then activate his or her smart portable device to communicate with the SPD 44 at 86. In one embodiment, communication between the two users, i.e., the keyfob owner and the SPD owner, may be through the social network App running on the SPD linked to the keyfob and the social network App running on SPD 44, which is shown at 86.

If the list 50 (FIG. 2) of advertised keyfobs does not reveal any recognized friends, friends-of-friends, or names that the SPD owner wants to make friends with, the SPD owner can simply disconnect from the keyfob App at 90 by logging off or simply exiting the KFA.

Referring again to FIG. 1, assuming that the owners of SPD1 and SPD2 accept the invitations when buzzed by their keyfobs KF1, KF2 to connect with SPD3 and SPD4, respectively, all four owners of the smart portable devices 12, 14, 16, 18 can now communicate directly through their respective social network Apps, such as FB Apps, running on their SPDs or through web browsers. Thus, communications between the various devices can now open at links 20, 92, 94, and 96. One or more of links 20, 92, 94, and 96 may also establish when one or more of the users physically cross-paths and alert one another. Accordingly, in a crowded venue in which initially no smart portable devices communicate with any other smart portable devices, aspects of the present devices, systems, and methods facilitate social networking by offering an App, such as a keyfob App, to run on a SPD that scans for advertised social network user information to enable the accessory owners (such as keyfob owners and dongle owners) and SPD owners to evaluate whether they are friends, friends-of-friends, or people that they want to make friends with to further promote social networking.

In one venue example, such as in a movie theater, when SPD and keyfob users and owners wait for an event to start, connections between the SPDs and keyfobs are facilitated by aspects of the present devices, systems, and methods. Once the users establish connection links as described above, they can chat, socialize, and/or play live games through their SPDs, such as trivial pursuit, share comments regarding the movie, the show, etc. In another example, two or more of the SPD users can qualify for refreshment discounts when they collaborate and purchase in bulk (i.e., purchase two popcorn buckets by two different users instead of one bucket by one user). As understood, the collaboration is facilitated by the present devices, systems, and methods, which allow the users to connect and who otherwise may not know about one another.

Figure 4:
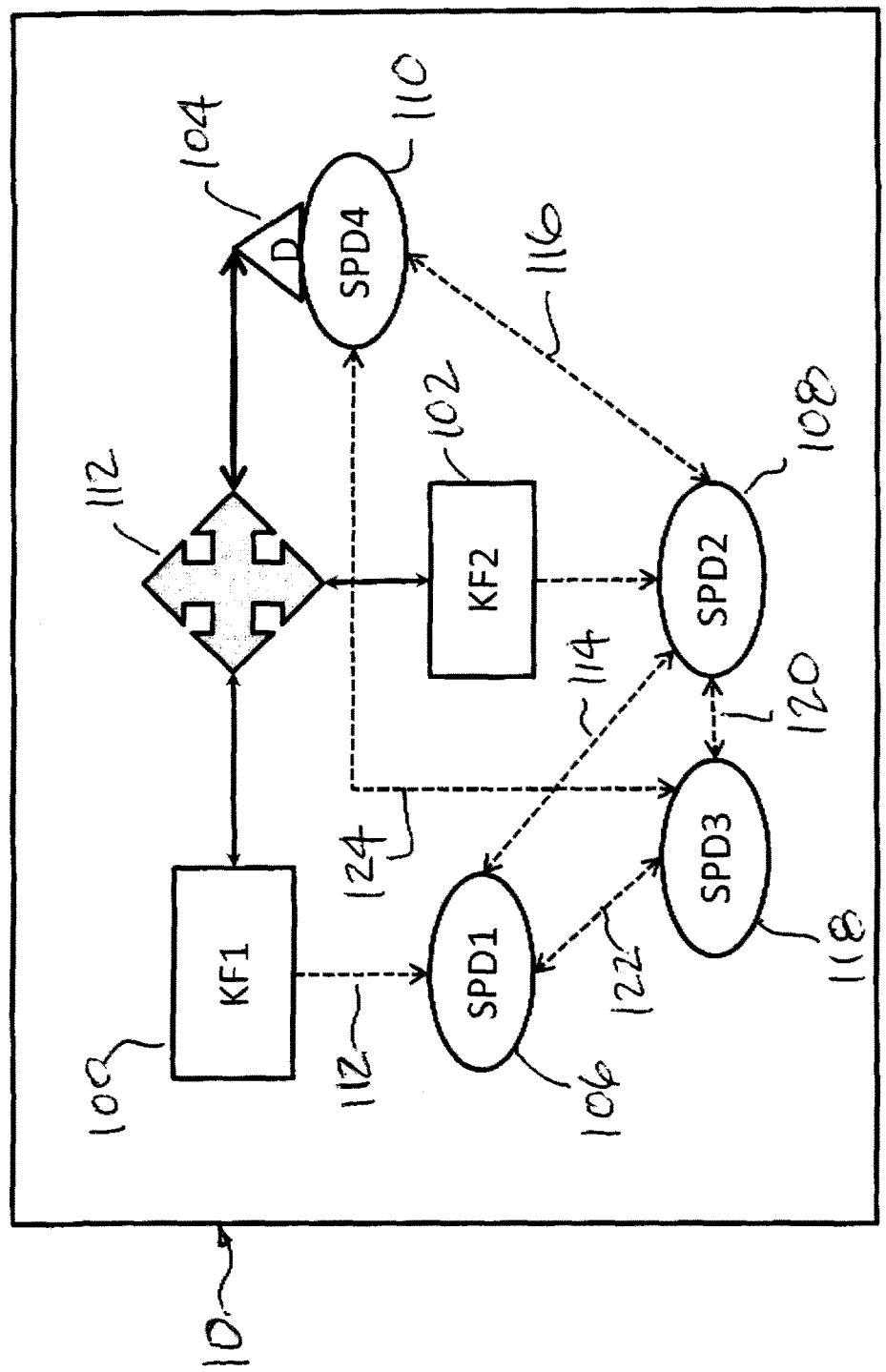
FIG. 4 is a schematic diagram of another venue having several smart portable devices and communication accessories located therein.

FIG. 4 is a schematic diagram showing a venue 10, such as a bar, a restaurant, a department store, a night club, etc. in which the venue owner wishes to encourage repeat business and promote networking, among other commercial interests. For example, the venue owner can have a store policy wherein any individual that enters the store and turns on his or her communication accessory, such as a keyfob or a dongle, to advertise his or her social network user information, he or she will receive a discount towards a first purchase, such as 15% to 50% off the first purchase. In an embodiment, if the store recognizes one of the keyfob owners as a repeat customer after the keyfobs are turned on to advertise, the store can offer a discount to incentivize customer loyalty.

In the example of FIG. 4, there are two keyfobs KF1 100, KF2 102 and a dongle 104, i.e. there are three communication accessories. The keyfobs KF1, KF2 belong to the owners of the smart portable devices SPD1 106 and SPD2 108, respectively, and can communicate with the smart portable devices as described above. The dongle 104 may be understood as a device that can transmit and receive data, such as a Bluetooth enabled dongle, and is connected to the smart portable device SPD4 110 through the device's audio jack port (e.g. TRS or TRRS connector) or docking connector, such as Apple's proprietary 30-pin connector or any portable digital media interface (PDMI) used by the consumer electronic industry. In one example, the dongle 104 has an integrated chip and can be programmed to advertise like the keyfobs discussed elsewhere herein. Additionally or alternatively, the dongle can be programmed to receive information from another device and communicate with the other device using the connected interface of the smart portable device SPD4 110. The venue may contain additional keyfob owners and dongle owners than as shown.

With reference again to FIG. 4, the owner or operator of the venue 10 continuously scans the venue for advertised keyfobs and dongles using a smart portable device 112 that is BLE capable, such as the new iPad 3 or the iPhone i4S, or other Bluetooth devices to detect signals from the keyfobs KF1, KF2 and the dongle D 104. The venue device 112 may alternatively be a desktop computer or a laptop with built-in Bluetooth connectivity or with a USB Bluetooth dongle. For all detected signals advertised by the keyfobs and the dongles, the store owner or operator sends signals to buzz or otherwise alert the devices and provide them with the store's data or information, such as the store's social network user information, e.g., FBID, and a message indicating that discounts are available for connecting with the store's SPD 112.

If the keyfob owners and the dongle owner activate their smart portable devices SPD1 106, SPD2 108, and SPD4 110, they can then all communicate with the store owner or operator through a networking site, such as through Facebook, instant messaging, etc. Additionally, the store owner or operator can detect whether the device owners are friends or are friends of mutual friends and can so notify the owners of SPD1 106, SPD2 108, and SPD4 110. This feature is a commonly used option on Facebook and on LinkedIn. If the owners of the devices are indeed friends or are friends of mutual friends, then they can connect directly with one another using Facebook Apps or web-browsers on the devices to establish connections 112, 114, 116. The devices 106, 108, 110 can also communicate directly with the venue operator using the Facebook Apps or a web-browser.

In the example of FIG. 4, the owner of SPD3 118 does not have a keyfob or a dongle. However, the owner of the device 118 either connects to the venue's Facebook page or runs into one of the other device owners and turns on his or her device 118 to connect or socialize. This enables the device SPD3 118 to communicate with the other devices 106, 108, 110, 112 through connections 120, 122, 124 (connection between SPD3 118 and the venue operator 112 is not shown).

In an alternative embodiment, the dongle D 104 is used to receive signals, such as signals from the device 112 belonging to the venue operator. Upon detecting advertised signals from the venue device 112, the dongle is programmed to activate the keyfob App on the SPD4 110 and displays a message from the venue operator. The message can be a welcome message, a sales message, a reward message, a list of specials message, a news message, a message regarding other FB users, or combinations thereof.

In some examples, the connected devices SPD1 106, SPD2 108, SPD3 118, SPD4 110, and 112, provide an opportunity for Facebook commerce, known on the Internet as F-Commerce. For example, the venue operator can entice the device owners to pool together to purchase multiple items from the venue at a discounted price, such as buying two drinks for the price of one. The venue owner or operator can facilitate more buying by creating a social environment, such as a gathering, as a result of the device connectivity. The venue owner can remember the buying or consuming habits of the device owners for future reference. The venue owner can also gather information from the device owners social network accounts, such as Facebook accounts, to identify special occasions, such as birthdays, anniversaries, promotions, etc. In some instances, the device owner and operator are the same party.

As described herein, a device, system, and method in accordance with aspects of the present disclosure is an accessory, such as a keyfob or a dongle, having Bluetooth low energy (BLE) connectivity for use with a smart portable device; wherein the accessory is programmed to advertise a signal comprising social network user information; and wherein the accessory comprises a switch configured to turn on to advertise the signal or to turn off and not advertise the signal. In a particular embodiment, the information for or related to the social network website comprises Facebook identification information.

With reference now to FIG. 5, a system 130 is shown that includes a person 140 using a keyfob KF 142 to post or interact with others on a social network site, such as on Instagram.com or Facebook.com. In one example, a keyfob 142 having BLE connectivity is programmed to send a signal to a smart portable device 132 to wirelessly activate the camera function on the SPD 132 to take a picture of the person 140. In another example, the keyfob is programmed to activate the video recording function on the SPD. The SPD 132 may include a tripod or a device mount 134 for holding the device 132 on a flat surface or to grab on to a surface to hold the device at an elevated position. For example, the device mount can embody a flexible tripod similar to Gorillapod tripod. In an example, the keyfob 142 is programmed with both a remote function for wirelessly activating the camera function on the device 132 and advertising function as described elsewhere herein.

After a picture or several pictures are taken wirelessly using the keyfob 142, the user 140 can edit the picture or pictures at 136. The user can then post the picture or pictures on a site 138, optionally along with a message or a note. In one example, the picture or pictures are posted on the Instagram website. The pictures may also include geotagging, which can include GPS latitude metadata, GPS longitude metadata, GPS position metadata, or combinations thereof. Pictures with geotagging may be used to help the user to locate, for example, where he had parked or had visited.

Thus, an aspect of the present method is understood to include the steps of wirelessly taking a picture on a smart portable device using a keyfob, said keyfob comprising a button or a switch and BLE connectivity. In an example, said method further comprises the step of posting a picture on the Instagram website, wherein said picture was taken by said keyfob.

In a still further application of the present disclosure, a keyfob App operating on a smart portable device is programmed with proximity sensing using signal strengths of the various keyfobs to determine the range, such as in feet or yard, of the various keyfobs to the smart device that is running the keyfob App. In one example, a child is holding the keyfob and as soon as he enters his house, the smart device detects the key fob and notifies his parent(s) that he is home. In another example, the child has the keyfob and when he wanders more than a certain distance from the smart device, the smart device sounds an alarm, such as buzz, vibrate, and/or emit an audible signal, to alert his parent(s) that he is beyond a certain distance. In yet another example, the proximity sensing can be used as a work clock to check a worker in and out. For example, a worker has the keyfob and shows up for work. The smart device can detect the worker and can even check him in for accounting or billing purposes. Then when he leaves in the evening, the smart device can sense that the signal is lost and can interpret that as meaning the worker has gone home for the day and can check him out. Throughout the work day, the presence of the worker's signal emitted from the keyfob can be interpreted as him being on site.

In a still further application of the present system, device, and method, business or work information may be stored on keyfobs and the SPDs, using the keyfob Apps discussed elsewhere herein, detect the stored information and store the same on the SPDs, which may sent or synchronized to other smart devices, such as to desk top computers. This allows the various SPD owners to exchange work information stored on the keyfobs like business cards.

In still yet another example, an App can be programmed on an SPD to search TV programming information for a particular branded TV and then send information to a KF to then remotely control the TV. This allows the keyfob owner to operate any TV from anywhere, provided the programming information is available to be downloaded by the SPD. Additionally, the keyfob can be programmed to control stereos, DVD players, amplifiers, and other remote control devices.

With reference now to FIG. 6, a schematic diagram showing cloud computing 160 for remote services to or for a user's data, software, and computation. Exemplary cloud computing includes DropBox and Google Drive. Currently, a user may access his or her cloud service or data through a laptop 102, a desktop (not shown), a tablet (not shown), herein generally referred to as a computing device, or mobile app using a smart personal device (SPD) 164. Traditional protection mechanisms such as passwords and encryption/decryption are available but are universally understood to be vulnerable to threads from hackers and viruses. Accordingly, in one aspect of the present disclosure, a unique identifier is provided by a keyfob 166, which must be within range of a computing device or an SPD to enable uploading and/or downloading the cloud data.

In one example, encryption/decryption keys are stored in the keyfob 166. Cloud data can only be processed and viewed (or heard, in the case of audio data) only when the keyfob 166 is in the proximity of the computer/smartphone that's processing the cloud data. Thus, the keyfob 166 can act like a unique key that will only allow access when the actual keyfob is within the BLE proximity. For greater security, the encryption/decryption key in the keyfob can be combined with a password that the user defines and enters to form a final key for the app to use in the encryption/decryption process.

In a specific example for implementing keyfobs with cloud computing, such as to upload a text document, a photo, or an audio file, the user with the keyfob, or the keyfob, is first placed in sufficient connectivity distance with the device to perform the cloud computing. As previously discussed, this range can vary as technology advances but is presently understood to be within about a thirty yard radius. The keyfob 166 is connected wirelessly to the computer 162 or to the smartphone 166, as discussed above. If a dongle is used instead of the keyfob 166, the dongle is first physically connected to the computing device. The software on the computer 162 or the app on the smartphone 164 then reads the unique key from the keyfob 166, such as a unique ID address. The user is then prompted and enters a password previously stored or set up in the system. They key read from the keyfob and the password are used to encrypt the data (text or photo/video or audio) to upload the cloud servers.

To download and view/listen to the encrypted cloud data by the instant security scheme of the present system and method, the user with the keyfob 166, or the keyfob, is again placed in sufficient connectivity distance with the device 162 or 164 to perform the cloud computing and connected therewith wirelessly. The software on the computer 162 or the app on the smartphone 164 then reads the key from the keyfob 166. The user is then prompted to enter a password. After the password is authenticated along with the key, the encrypted file is downloaded from the cloud servers. The security algorithm then compares the downloaded encrypted file with the key and password used for downloading before the data can decrypt for viewing or listening. In an alternative embodiment, once the device for computing authenticate both the key from the keyfob and the password, the encrypted filed can be downloaded and decrypted automatically or after a response to a prompt without further authentication.

Thus, an aspect of the present device, system, and method is understood to include a keyfob having a unique key to enable uploading and downloading of cloud data, which can include text file, data file, or video file. In one example, the unique key stored in the keyfob and is used with a computing device or a smartphone running an app to encrypt data before the data is uploaded to the cloud. In another example, a password is used in addition to the key to encrypt data before the data is uploaded to the cloud. The device, system, and method are also understood to include the use of a keyfob to download and decrypt encrypted data from the cloud.

Another aspect of the present device, system, and method is the use of keyfobs to facilitate physical activities. Keyfobs can and typically include built-in sensors such as accelerometer and IR circuitries. By utilizing these sensors, keyfobs can be integrated into workout or exercise routines. For example, users can track their daily exercises and get motivated or rewarded based on how they program their keyfob workout app (KWA). With reference to FIG. 7, the keyfob 166, which can be worn on the user 170, can measure the amount of motions, such as discrete acceleration data, while the user 170 exercises, such as via the accelerometer in the keyfob. This motion data is then analyzed by the KWA running on a SPD or on a computing device, such as a tablet. The app, which in one example may be identified as "GymDJ," can analyze and manipulate the data in real time to, for example, change the speed of the music being played on a wireless connectivity enabled boom box 172. Music an alternatively be provided by a wired earphone or headphone or via external Bluetooth or WiFi speakers.

The app can motivate the user to keep up with the exercise and give feedback in a number of different ways. For example, if the user 170 does not exercise vigorously enough as determined by a threshold preset in the app set up by the user, the music will be played at slower than normal speed of the song, for example at 0.5X where X is the normal speed. If the user instead meets or exceeds the threshold, the music can be played at normal speed, e.g., at 1X, or at some greater increment up to, for example, 2X. Thus, if the user 170 chooses to slack off or not exercise, such as being a "couch-potato" 174, then any music played through his sound system 172 is played in slow motion unless he overrides the GymDJ, as an example. Conversely, if the user vigorously exercises, such as mimicking a long ride on his bike 176 on the Tour de France, then any music played through his sound system 172 can be at regular or greater than normal speed unless he overrides the GymDJ, as an example.

In another example, the GymDJ can be programmed to play a less desirable tune if the user is underperforming or not properly exercising and plays a more desirable tune when he meets or exceeds the threshold preset.

In yet another example, if the user exercises vigorously for a preset amount of time each day, then the IR infrared circuitries in the key fob 166 can be enabled to turn on TV or other electronic devices, such as a stereo, to reward the user. Thus, an aspect of the present device, system, and method is an entertainment device, such as a stereo, a digital music player, a TV, a DVD player, etc., that is operable or controllable by a keyfob and wherein outputs from the keyfob for controlling the one or more entertainment devices are dependent on preset conditions established by the user of the keyfob. For example, the conditions can be exercise conditions that are based on time or acceleration. In a specific example, the time and/or acceleration are directly linked to the user's motions, such as from exercising, from vigorous exercises, and from duration of exercise.

With reference now to FIG. 8, the keyfob 166 is shown with built-in IR circuitries, and optionally with an accelerometer with circuitries. The keyfob 166 is configured to wireless connect with a smartphone app running on the smart portable device (SPD) 164, as previously discussed. In the present example, the smartphone app is a TV viewer app (TVA), which allows the user to scan a list of shows and schedules and to turn to the particular channel on the TV 180, via the keyfob 166, of interest to watch. The TVA is programmed to identify the user with the level and type of information that the user desires to share over the TVA, including the particular program or channel that the user is watching. Through the TVA, a network of users is linked to create chat-rooms to chat and/or exchange information about what they are watching. The users can be parsed by gender. Zip code, interests, age group, etc. so that surveys about a particular show, about a particular ad, about a particular issue, etc., can be performed. Various menus 182 and screens can appear on the SPD 164 to enable chatting and partaking in surveys. This info can be accessed by advertisers to market their products to the right consumers. For example, an advertiser can, with this information, offer group pricing and bulk pricing for the users that are chatting or networking across the TVA.

Although limited accessory embodiments and their components have been specifically described and illustrated herein, many modifications and variations will be apparent to those skilled in the art. For example, the various accessories may take on different shapes, sizes, and extra capabilities in addition to those described elsewhere herein. Furthermore, it is understood and contemplated that features specifically discussed for one example may be adopted for inclusion with another example, provided the functions are compatible. For example, while advertised signals are discussed with reference to FB identification information, the advertised signals or information can include any non-Facebook signals or information so long as connections between different smart portable devices are caused or facilitated initially by the accessories of the present description, i.e., keyfobs and dongles. Accordingly, it is to be understood that the accessories and their components constructed according to principles of the disclosed device, system, and method may be embodied other than as specifically described herein. The disclosure is also defined in the following claims.

What is claimed is:

1. A keyfob for wireless communication with at least one smart device running a keyfob App for use to communicate with the keyfob, said at least one smart device comprising at least one of a computer, a tablet, and a smart phone, said keyfob comprising:
a housing, a button, an integrated chip with Bluetooth connectivity, and one or more sensors located within the housing, said keyfob is programmed to emit a signal for detecting by the smart device, and wherein said signal emitted by the keyfob for detecting comprises a social network user identification; and
a unique key programmed with the keyfob for use by a smart device to encrypt and decrypt cloud data.

2. The keyfob of claim 1, wherein the social network user identification is linked to at least one of Facebook, LinkedIn, an email address, and business information.

3. The keyfob of claim 1, wherein the signal is Bluetooth low energy signal.

4. The keyfob of claim 1, wherein the integrated chip located in the housing is programmed to activate a camera associated with a smart device.

5. The keyfob of claim 1, wherein the button is a soft button or a hard button.

6. The keyfob of claim 1, wherein the keyfob can buzz, vibrate, or emit a sound when authenticated with a smart device.

7. The keyfob of claim 1, wherein the keyfob is programmed to transmit connectivity tokens and to buzz, vibrate, or emit sound following authentication with a smart device.

8. A keyfob for wireless communication with at least one smart device running a keyfob App for use to communicate with the keyfob, said at least one smart device comprising at least one of a computer, a tablet, and a smart phone, said keyfob comprising:
a housing, a button, an integrated chip with Bluetooth connectivity, and one or more sensors comprising at least one of an accelerometer and an infrared (IR) sensor located within the housing, said keyfob is programmed to emit a signal for detecting by the smart device, and wherein said signal emitted by the keyfob for detecting comprises a social network user identification; and
a smart device running the keyfob App, and wherein the smart device is programmed for activating the IR sensor or for analyzing data generated by the accelerometer on the keyfob.

9. The keyfob of claim 8, wherein the social network user identification is linked to at least one of Facebook, LinkedIn, an email address, and business information.

10. The keyfob of claim 8, wherein the signal is Bluetooth low energy signal.

11. The keyfob of claim 8, wherein the integrated chip located in the housing is programmed to activate a camera associated with the smart device.

12. The keyfob of claim 8, wherein the button is a soft button or a hard button.

13. The keyfob of claim 8, wherein the keyfob is structured to emit a buzz, vibrate, or emit a sound when authenticated by the smart device.

14. A communication system comprising a keyfob, at least one smart device running a keyfob App for wireless communication with said keyfob, a cloud server having a plurality of files stored therein including text files, photo files, and audio files to enable cloud computing;
wherein said keyfob comprises a housing, a button, an integrated chip, and one or more sensors located within the housing, said keyfob is programmed with a static key and said static key is usable by the at least one smart device to encrypt and decrypt data to or from the cloud server to upload or download one of the plurality of files.

15. The system of claim 14, wherein keyfob App operated by the at least one smart device prompts for a password before data is encrypted or decrypted.

16. The system of claim 14, wherein said integrated chip is programmed to emit a signal that advertises social network user identification for detecting by the smart device and wherein said social network user identification is linked to at least one of Facebook, LinkedIn, an email address, and business information.

17. The system of claim 14, wherein said keyfob App running on said at least one smart device is programmed for sending remote control signals to the keyfob.

18. The system of claim 14, wherein said keyfob App running on said at least one smart device is programmed for processing acceleration data generated by the keyfob.

19. The system of claim 14, wherein the keyfob App running on said at least one smart device is programmed to speed up or slow down audio files.

20. A method for facilitating F-commerce comprising:
scanning for information advertised by at least one keyfob or at least one dongle;
sending a signal to the at least one keyfob or the at least one dongle; and
wherein the information scanned is related to a social network user identification; and
wherein the signal sent to the at least one keyfob or the at least one dongle is related to pricing for a merchandise, a meal, a drink, or combinations thereof.

21. The method of claim 20, wherein the scanning is performed at a movie theatre, a restaurant, a bar, a night club, or a classroom.

22. The method of claim 20, wherein the scanning is performed by a computing device.

23. The method of claim 20, wherein the sending step comprises sending information about a website.

24. The method of claim 20, further comprising broadcasting a business e-mail address stored on the keyfob in a meeting environment.

25. The method of claim 20, further comprising activating a camera on a smart portable device.

* * * * *

UNITED STATES PATENT AND TRADEMARK OFFICE
CERTIFICATE OF CORRECTION

PATENT NO. : 9,959,242 B2
APPLICATION NO. : 13/889267
DATED : May 1, 2018
INVENTOR(S) : Hoang Nhu Page 1 of 1

It is certified that error appears in the above-identified patent and that said Letters Patent is hereby corrected as shown below:

In the Specification

In Column 1, Line 62, delete "Marketplace," and insert -- Marketplace. --, therefor.

In Column 1, Line 65, after "on" insert -- . --.

In Column 2, Line 32, delete ""talking."Thus," and insert -- "talking." Thus, --, therefor.

In Column 4, Line 3, delete "button:" and insert -- button; --, therefore.

In Column 10, Line 8, delete "i.e." and insert -- i.e., --, therefore.

In Column 10, Line 16, delete "(e.g." and insert -- (e.g., --, therefore.

Signed and Sealed this
Twenty-sixth Day of March, 2019

Andrei Iancu
*Director of the United States Patent and Trademark Office*